(12) United States Patent
Uejima et al.

(10) Patent No.: US 7,872,803 B2
(45) Date of Patent: Jan. 18, 2011

(54) GRID POLARIZING FILM, METHOD FOR PRODUCING THE FILM, OPTICAL LAMINATE, METHOD FOR PRODUCING THE LAMINATE, AND LIQUID CRYSTAL DISPLAY

(75) Inventors: Mitsugu Uejima, Tokyo (JP); Toshihide Murakami, Tokyo (JP); Akiyoshi Shibuya, Tokyo (JP); Megumi Fujita, Tokyo (JP); Masahiko Hayashi, Tokyo (JP); Kohei Arakawa, Tokyo (JP)

(73) Assignee: Zeon Corporation, Tokyo (JP)

( * ) Notice: Subject to any disclaimer, the term of this patent is extended or adjusted under 35 U.S.C. 154(b) by 393 days.

(21) Appl. No.: 11/921,091

(22) PCT Filed: May 29, 2006

(86) PCT No.: PCT/JP2006/310652

§ 371 (c)(1),
(2), (4) Date: Mar. 14, 2008

(87) PCT Pub. No.: WO2006/126707

PCT Pub. Date: Nov. 30, 2006

(65) Prior Publication Data

US 2009/0128904 A1 May 21, 2009

(30) Foreign Application Priority Data

| May 27, 2005 | (JP) | ............................. 2005-156438 |
| Aug. 25, 2005 | (JP) | ............................. 2005-244786 |
| Aug. 26, 2005 | (JP) | ............................. 2005-246414 |

(51) Int. Cl.
*G02B 5/30* (2006.01)

(52) U.S. Cl. ...................................... 359/486; 359/900

(58) Field of Classification Search .................. 359/485, 359/486, 900; 250/225; 349/96, 99
See application file for complete search history.

(56) References Cited

U.S. PATENT DOCUMENTS 5,177,635 A    1/1993   Keilmann (Continued)

FOREIGN PATENT DOCUMENTS

EP          1271499 A2       1/2003

(Continued)

OTHER PUBLICATIONS

Machine English translation of JP-2000-284117-A, wherein patent date is Oct. 13, 2000.

(Continued)

*Primary Examiner*—Frank G Font
(74) *Attorney, Agent, or Firm*—Birch, Stewart, Kolasch & Birch, LLP

(57) ABSTRACT

A lengthy grid polarizer film comprising a lengthy resin film and a plurality of grid lines provided on the surface and/or inside of the resin film and extending substantially in parallel with each other are provided, the grid lines being made of a material G being 1.0 or more in the absolute value of the difference between the real part $n_1$ and the imaginary part $\kappa_1$ of the complex refractive index ($N_1 = n_1 - i\kappa_1$), said resin film having a plurality of rows of grooves formed extending substantially in parallel with each other on its surface, and said grid line being made of a thin film of the laminated material G on the bottom face of the grooves and/or on the top face of ridges located between the adjacent grooves. A lengthy optical laminated body comprises the lengthy grid polarizer film and another lengthy polarizing optical film.

12 Claims, 6 Drawing Sheets

U.S. PATENT DOCUMENTS

| | | | |
|---|---|---|---|
| 6,317,264 B1 * | 11/2001 | Ll et al. | 359/487 |
| 6,417,939 B1 | 7/2002 | Laude | |
| 6,429,958 B1 * | 8/2002 | Puzey et al. | 359/239 |
| 6,532,111 B2 * | 3/2003 | Kurtz et al. | 359/486 |
| 6,665,119 B1 * | 12/2003 | Kurtz et al. | 359/486 |
| 6,788,461 B2 * | 9/2004 | Kurtz et al. | 359/486 |
| 6,847,448 B2 * | 1/2005 | Nagashima et al. | 356/364 |
| 6,943,353 B2 * | 9/2005 | Elmore et al. | 250/339.02 |
| 6,949,212 B2 * | 9/2005 | Merrill et al. | 264/288.4 |
| 7,106,507 B2 * | 9/2006 | Lee et al. | 359/486 |
| 2004/0174596 A1 | 9/2004 | Umeki | |
| 2004/0239833 A1 | 12/2004 | Kawazu et al. | |
| 2005/0088739 A1 | 4/2005 | Chiu et al. | |
| 2005/0123840 A1 * | 6/2005 | Totzeck et al. | 430/5 |
| 2005/0128587 A1 | 6/2005 | Suganuma | |

FOREIGN PATENT DOCUMENTS

| | | |
|---|---|---|
| JP | 1-314204 A | 12/1989 |
| JP | 3-103802 A | 4/1991 |
| JP | 6-230221 A | 8/1994 |
| JP | 2000-284117 A | 10/2000 |
| JP | 2000-304933 A | 11/2000 |
| JP | 2001-074935 A | 3/2001 |
| JP | 2003-66229 A | 3/2003 |
| JP | 2004-198999 A | 7/2004 |
| JP | 2005-172844 A | 6/2005 |
| WO | WO-02/091044 A1 | 11/2002 |

OTHER PUBLICATIONS

Machine English translation of JP-2001-074935-A, wherein patent date is Mar. 23, 2001.

Machine English translation of JP-2003-66229-A, wherein patent date is Mar. 5, 2003.

Supplementary European Search Report for Application No. EP06746930, dated Jul. 16, 2010.

* cited by examiner

[FIG.1]
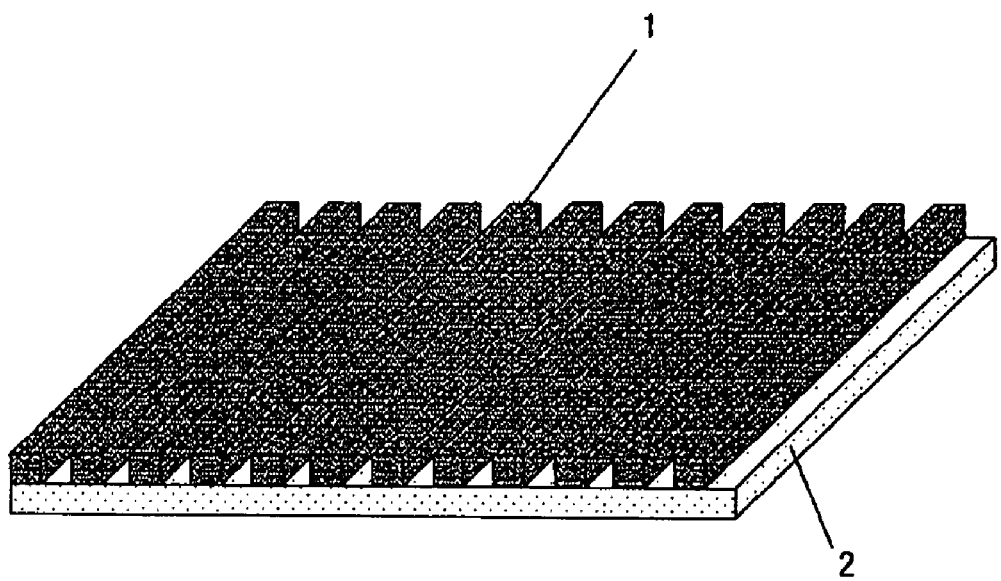
[FIG.2]
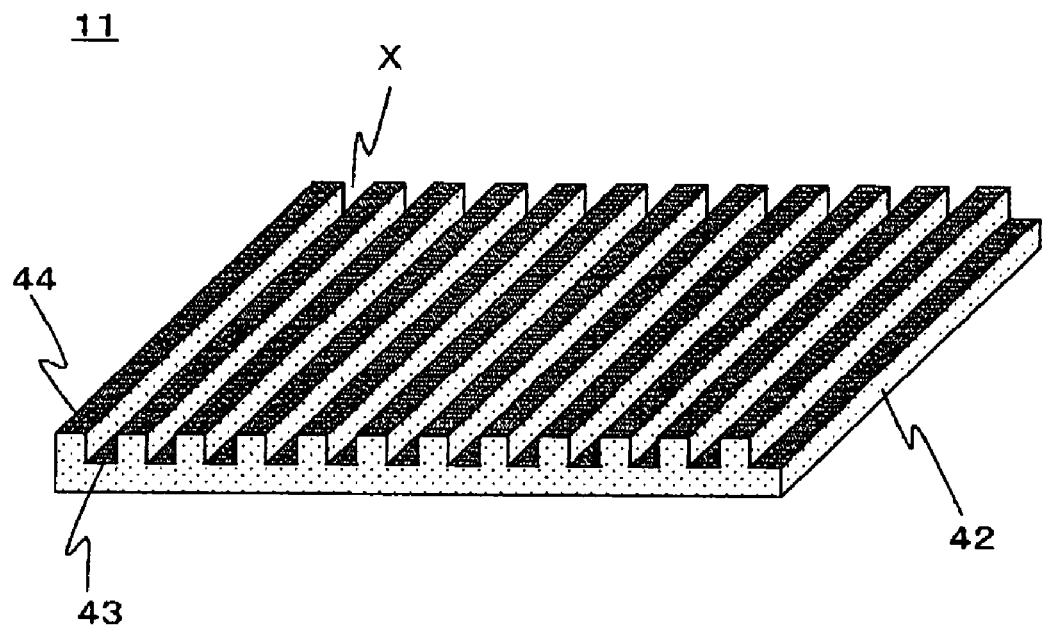

[FIG. 3]
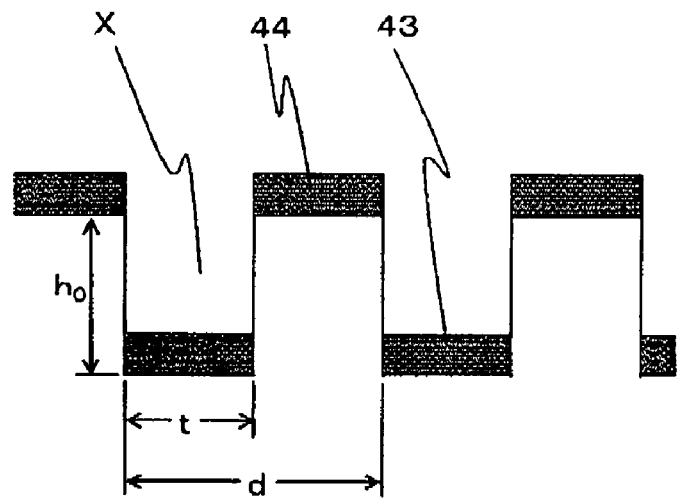
[FIG. 4]
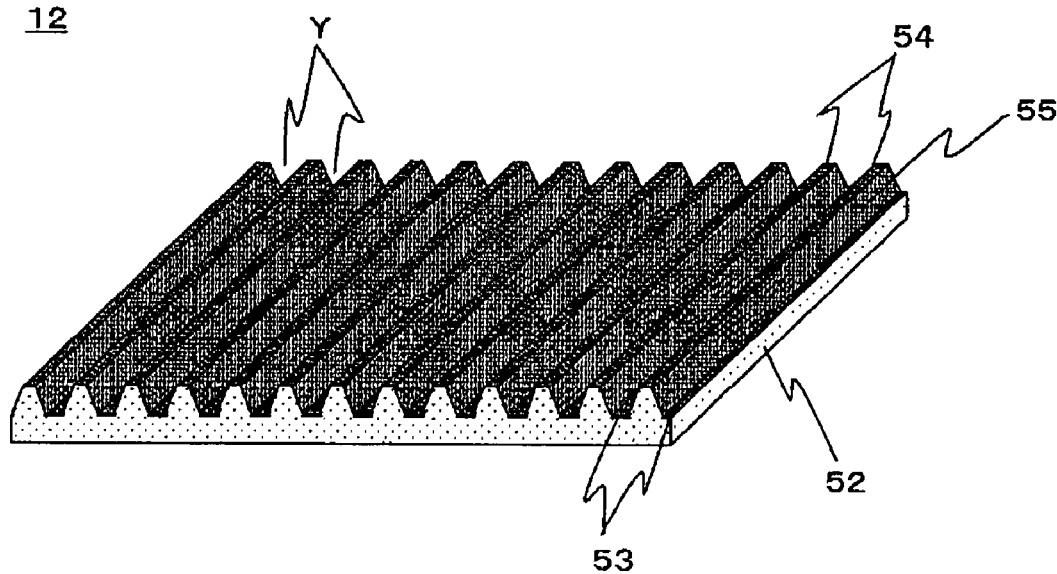

[FIG. 5]
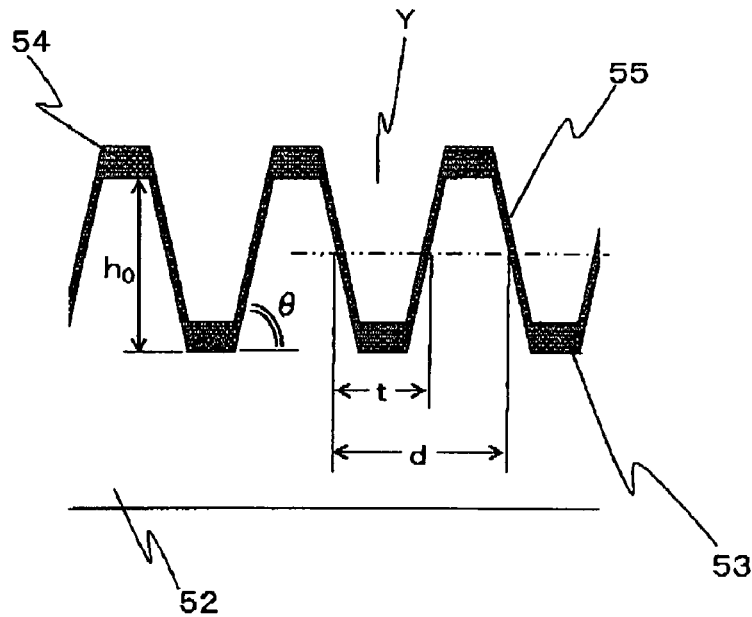
[FIG. 6]
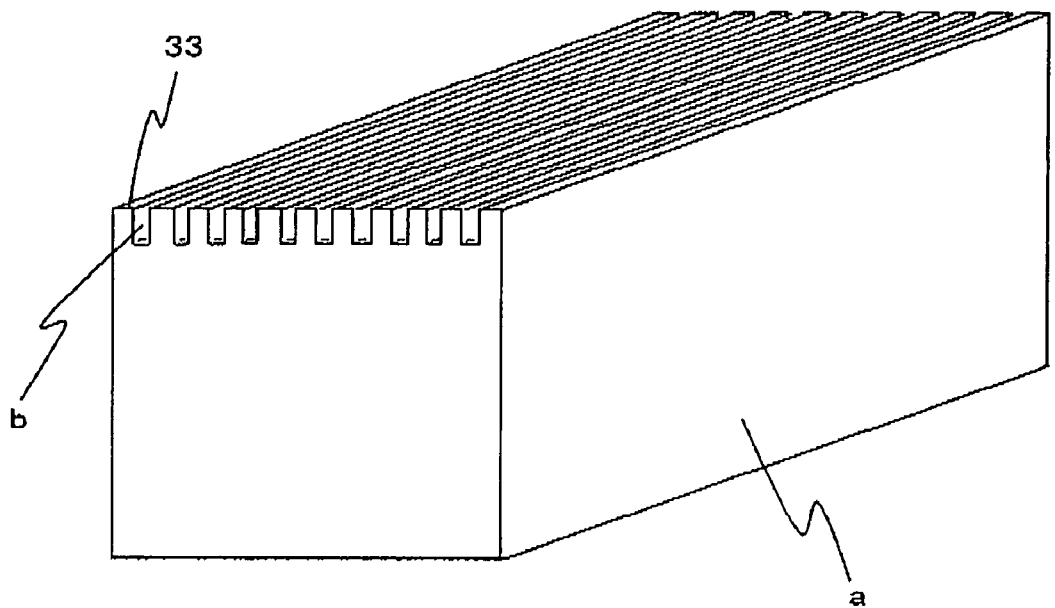

[FIG. 7]
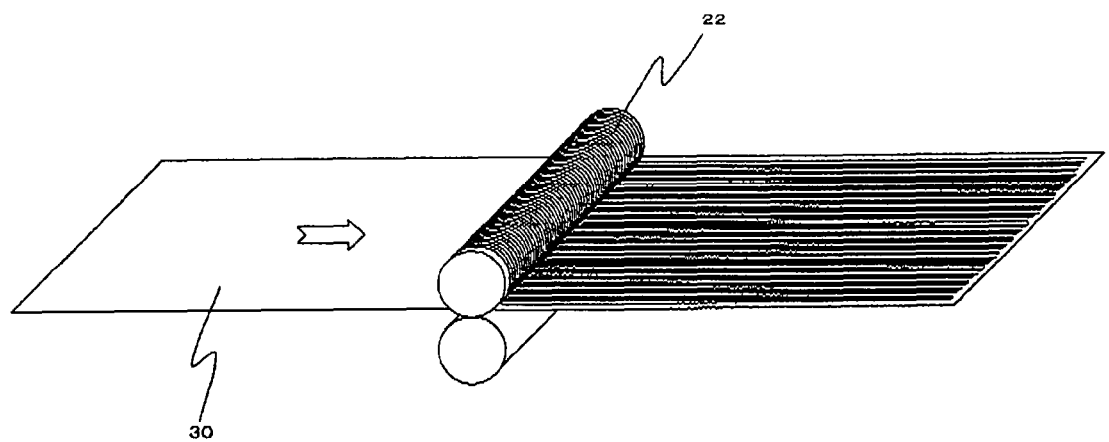
[FIG. 8]
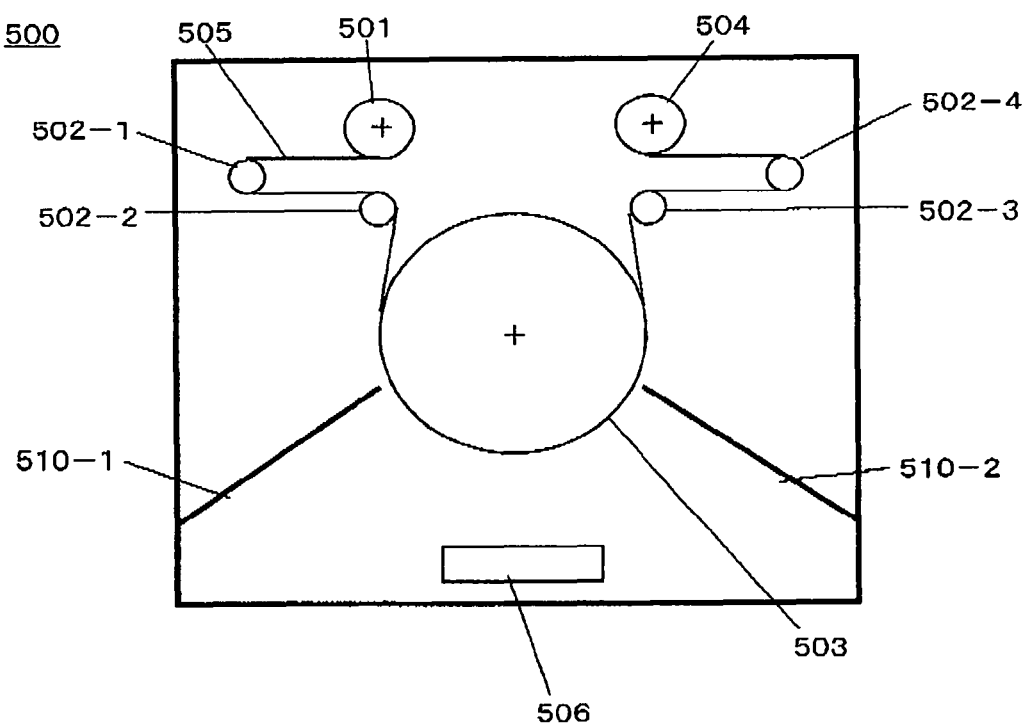

[FIG.9]
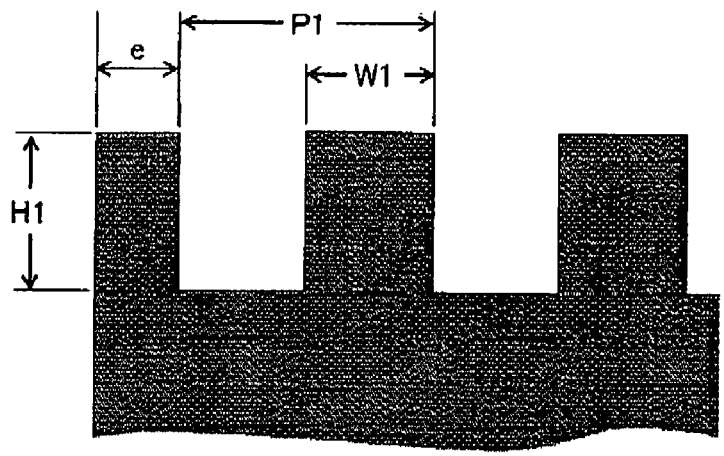
[FIG.10]
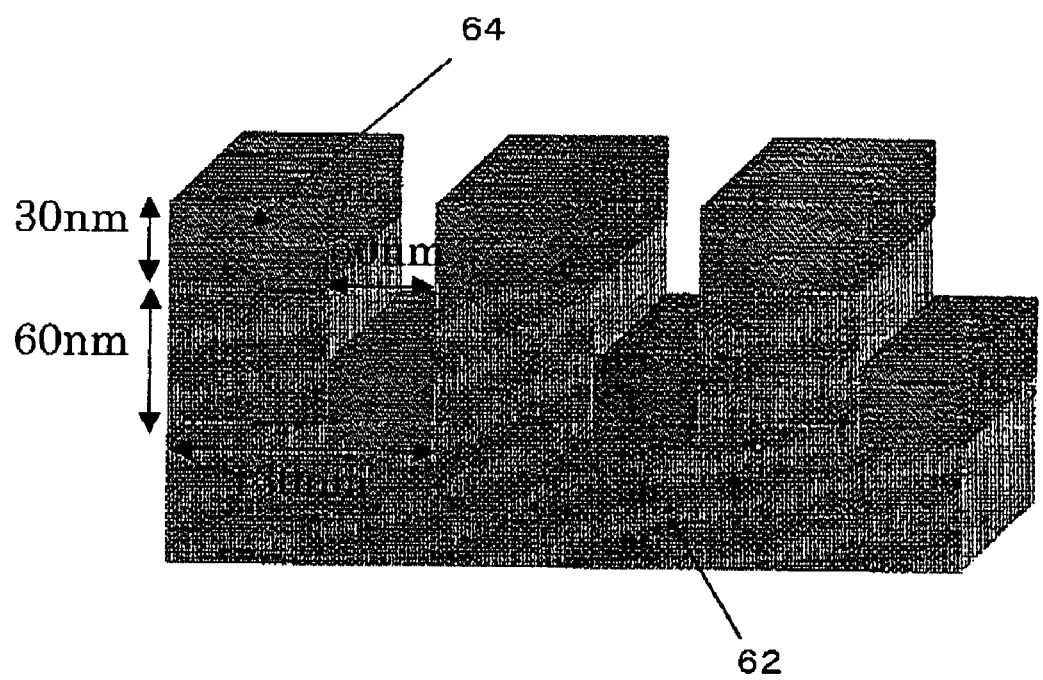

[FIG.11]
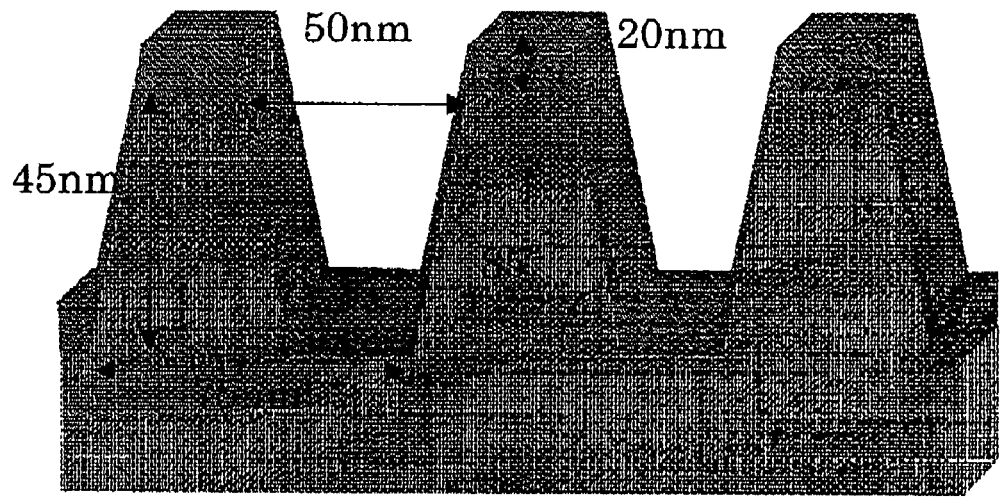
[FIG.12]
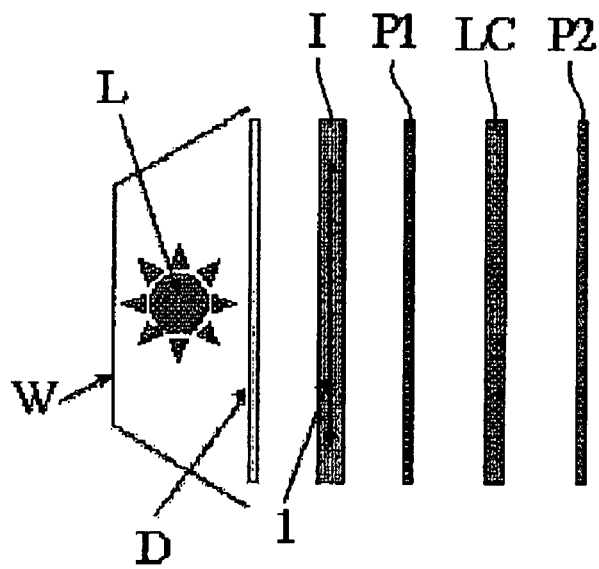

GRID POLARIZING FILM, METHOD FOR PRODUCING THE FILM, OPTICAL LAMINATE, METHOD FOR PRODUCING THE LAMINATE, AND LIQUID CRYSTAL DISPLAY

TECHNICAL FIELD

The present invention relates to a grid polarizer film, a manufacturing method of a grid polarizer film, an optical laminated body, a manufacturing method of an optical laminated body, and a liquid crystal display.

BACKGROUND ART

A grid polarizer has been known as a polarizer which can freely set a polarization plane (see Non-patent Document 1). This is an optical part having a grid structure in which a large number of linear metals (wire) are arranged in parallel in a constant cycle. In the case of such a metal grid, if the grid cycle is shorter than a wavelength of an incident light, a polarized light constituent parallel with the linear metal forming the metal grid is reflected while a perpendicular polarized light constituent transmits, which functions as a polarizer creating a uniaxial polarized light. Use of this grid polarizer as an optical part of an isolator in optical communication or as a part for increasing a utilization rate of light and for improving brightness in a liquid crystal display is proposed.

[Non-patent Document 1] H. Hertz "Electric Waves", Macmillan & Company Ltd., London, 1893, p. 177

As a method for forming a grid structure, Patent Document 1 discloses a method in which metal is formed on a light transmissive substrate by deposition, sputtering, or ion plating, resist is applied thereon, photoengraving is carried out and then, stripes of thin wires are formed by UHF-ECR plasma etching. Patent Document 2 discloses a method of depositing a copper thin film on one side of a light transmissive substrate and forming a grid pattern in which a large number of copper thin wires are disposed in parallel by ion-milling with photolithographic technology using photo-resist which is substantially equivalent to the light transmissive substrate in a refractive index when hardening. Since an etching process is employed for these methods, only a grid polarizer with a narrow area can be obtained (0.3 μm×0.07 μm for Patent Document 1,1-inch diameter for Patent Document 2).

[Patent Document 1] Japanese Patent Laid-Open No. 2003-66229

[Patent Document 2] Japanese Patent Laid-Open No. 2000-284117

Patent Document 3 discloses a producing method for a grid polarizer film having an anisotropic structure in which a portion with metal and a portion where the polymer film is exposed are alternately arranged in the stripe state by forming a metal film on a polymer film, uniaxially drawing a laminated body of the polymer film/metal film so as to generate a crack in the metal in a direction crossing the drawing direction. Resins used for the polymer film include thermoplastic resins such as polycarbonate, polyethylene terephthalate, polyethylene, polyvinyl chloride, polysulphone, poly allylate, polyethersulphone, cellulose diacetate, and cellulose triacetate; polymethylmethacrylate, and thermoplastic resins with small photoelastic coefficient known by trademark as ARTON and ZEONEX. However, with the method described in Patent Document 3, it is extremely difficult to control a width, shape and the like of a crack generated in the metal film, and there is a problem that a uniform optical characteristic is hard to be gained in a plane. Also, if the grid polarizer film obtained by this method is left in a high-temperature and high-humidity environment, the polymer film slightly shrinks and the polarizing characteristics might be changed.

[Patent Document 3] Japanese Patent Laid-Open No. 2001-74935

DISCLOSURE OF THE INVENTION

Problems to be Solved by the Invention

An object of the present invention is to provide a wide lengthy grid polarizer film which is excellent in polarized light isolation performance of polarized light, and a method for easily manufacturing it.

Another object of the present invention is to provide a grid polarizer film which can increase a use efficiency of light in a display device such as a liquid crystal display, uniformly improve brightness in a plane and has no deterioration in optical characteristics even under a high-temperature and high-humidity environment.

Means for Solving the Problems

The applicant has found after examination in order to achieve the above objects that a lengthy grid polarizer film in which thin film constitutes grid line can be obtained by continuously forming a fine projection and recess shape on a lengthy resin film surface using a transfer roller having a fine projection and recess shape and by forming the thin film made of a material being 1.0 or more in the absolute value of the difference between real part and imaginary part of complex refractive index on the projection and recess surface. And the applicant has completed the present invention based on the findings.

According to the present invention, a lengthy grid polarizer film is provided comprising a lengthy resin film and a plurality of grid lines provided on the surface and/or inside of the resin film and extending substantially in parallel with each other, wherein the grid lines are made of a material G being 1.0 or more in the absolute value of the difference between real part $n_1$ and imaginary part $\kappa_1$ of complex refractive index ($N_1 = n_1 - i\kappa_1$).

As another mode of the present invention, a grid polarizer film is provided comprising a transparent and lengthy resin film in which a plurality of rows of grooves extending substantially in parallel with each other are formed on the surface and a thin film made of a material G being 1.0 or more in the absolute value of the difference between real part $n_1$ and imaginary part $\kappa_1$ of complex refractive index ($N_1 = n_1 - i\kappa_1$) laminated on a bottom face of the groove and/or a top face of a ridge between the adjacent grooves and in which a width t of the groove of the resin film, an interval d between the adjacent grooves, a slope angle θ of a side wall of the groove, a depth $h_0$ of the groove, a film thickness $h_1$ of the thin film laminated on the bottom face and/or a top face, the complex refractive index $N_0$ ($=n_0-i\kappa_0$) of the resin film for light with a wavelength in vacuum of $\lambda_0$ and the complex refractive index $N_1$ ($=n_1-i\kappa_1$; $n_1 \geq 2.5$ or $\kappa_1 \geq 1.5$) of the material G for light with a wavelength in vacuum of $\lambda_0$ satisfy the relation of:

$$-0.1\delta < (h_0 - h_1); \text{ however, } \delta = \lambda_0/(2\pi^2 n_1^2 \kappa_1)^{1/2} \tag{1}$$

$$60° \leq \theta \leq 90°; \tag{2}$$

however, z is a distance in the groove depth direction; θ(z) is an inclination angle of a side face against a direction crossing the groove depth direction in the distance z;

[Formula 1]

$$\theta = \frac{1}{h_0} \int_0^{h_0} \theta(z)\,dz \quad \text{(A)}$$

$$d < \lambda_0/n_0, \text{ and} \quad (3)$$

$$0.1\,d < t < 0.8\,d \quad (4)$$

According to the present invention, a manufacturing method of a lengthy grid polarizer film is provided in which a plurality of rows of grooves extending substantially in parallel with each other are formed on a lengthy resin film surface using a transfer mold or a transfer roller, and then, on the bottom face of the groove and/or on the top face of the ridge located between the adjacent grooves, a grid line is formed by laminating a thin film made of a material G being 1.0 or more in the absolute value of the difference between real part $n_1$ and imaginary part $\kappa_1$ of complex refractive index ($N_1 = n_1 - i\kappa_1$).

Also, a manufacturing method of a grid polarizer film is provided in which, on a transparent resin film surface with the complex refractive index $N_0$ (=$n_0 - i\kappa_0$) for the light with a wavelength in vacuum of $\lambda_0$, a plurality of rows of grooves extending substantially in parallel with each other are formed by an emboss processing method so that a width t of the groove, an interval d between the adjoining grooves, a slope angle θ of a side wall of the groove, and a depth $h_0$ of the groove would satisfy the relation as follows:

$$-0.1\delta < (h_0 - h_1); \text{ however, } \delta = \lambda_0/(2\pi^2 n_1^2 \kappa_1)^{1/2} \quad (1)$$

$$60° \leq \theta \leq 90°; \quad (2)$$

however, z is a distance in the groove depth direction; θ(z) is an inclination angle of a side face against a direction crossing the groove depth direction in the distance z;

[Formula 2]

$$\theta = \frac{1}{h_0} \int_0^{h_0} \theta(z)\,dz \quad \text{(A)}$$

$$d < \lambda_0/n_0, \text{ and} \quad (3)$$

$$0.1\,d < t < 0.8\,d, \text{ and} \quad (4)$$

a thin film made of the material G with the complex refractive index $N_1$ (=$n_1 - i\kappa_1$; $n_1 \geq 2.5$ or $\kappa_1 \geq 1.5$) for the light with a wavelength in vacuum of $\lambda_0$ is laminated with the film thickness of $h_1$ on the bottom face of the groove and/or on the top face of the ridge located between the adjacent grooves.

According to the present invention, a lengthy optical laminated body comprising the above lengthy grid polarizer film and another lengthy polarizing optical film is provided.

Also, according to the present invention, a manufacturing method of a lengthy optical laminated body is provided in which the above lengthy grid polarizer film wound in the roll state and another lengthy polarizing optical film wound in the roll state are fed out of respective rolls, the grid polarizer film and the another polarizing optical film are laminated in close adhesion; and Moreover, according to the present invention, a liquid crystal display comprising an optical member cut out of the above lengthy grid polarizer film is provided.

Effects of the Invention

Since the grid polarizer film of the present invention is wide and lengthy, and is excellent in polarized light isolation performance, those bonded with another lengthy polarizing optical film can be roll-to-roll laminated in the lengthy state. According to the manufacturing method of the present invention, distribution of grid lines made of a material being 1.0 or more in the absolute value of the difference between real part and imaginary part of complex refractive index can be precisely controlled to easily obtain a lengthy grid polarizer film.

By arranging the grid polarizer film of the present invention between a liquid crystal cell and a backlight unit in a liquid crystal display, picture of a frame portion is not colored even in white displaying mode after being left at a high temperature and high humidity but use efficiency of light can be further increased and brightness can be improved. Moreover, even after being left at a high temperature and high humidity, brightness improvement effect is not changed or uneven color/brightness distribution does not occur.

BRIEF DESCRIPTION OF DRAWINGS

FIG. 1 is a perspective view illustrating a grid polarizer film according to a first embodiment of the present invention.

FIG. 2 is a perspective view illustrating a grid polarizer film according to a second embodiment of the present invention.

FIG. 3 is a sectional view illustrating a section of the grid polarizer film according to the second embodiment of the present invention.

FIG. 4 is a perspective view illustrating a grid polarizer film according to a third embodiment of the present invention.

FIG. 5 is a sectional view illustrating a section of the grid polarizer film according to the third embodiment of the present invention.

FIG. 6 is a view illustrating an example of a grinding tool used for manufacturing a transfer roller used for a manufacturing method of the present invention.

FIG. 7 is a view illustrating an example of a process forming a projection and recess shape on a resin film surface by a transfer roller used for the manufacturing method of the present invention.

FIG. 8 is a diagram illustrating an example of a continuous sputtering device used for forming a thin film in the manufacturing method of the present invention.

FIG. 9 is a diagram illustrating an example of a tip-end structure of a cutting tool used for manufacturing the transfer roller used in the manufacturing method of the present invention.

FIG. 10 is a diagram illustrating a grid polarizer film manufactured in example 3 of the present invention.

FIG. 11 is a diagram illustrating a grid polarizer film manufactured in example 4 of the present invention.

FIG. 12 is a view schematically showing a liquid crystal display comprising the grid polarizer film of the present invention.

EXPLANATION OF SYMBOLS

1: Grid line;
2, 30, 42, 52, 62: Resin film (substrate);
X, Y: Groove;
43, 44, 53, 54, 55, 64: Thin film;

11, 12: Grid polarizer film;
22: Transfer roller;
500: Continuous sputtering device;
501: Feeding-out Roller;
502-1, 502-2, 502-3, 502-4: Guide roller;
503: Film forming roller;
504: Take-up roller;
506: Target;
510-1, 510-2: Protecting plate;
D: Diffusing plate;
I: Grid polarized light isolating film;
L: Light source;
LC: Liquid crystal cell;
P1, P2: Absorbing-type polarizing film;
W: Reflecting plate;

BEST MODE FOR CARRYING OUT THE INVENTION

Grid Polarizer Film

A lengthy grid polarizer film of the present invention comprises a lengthy resin film and a plurality of grid lines provided on a surface and/or inside of the resin film and extending substantially in parallel with each other. The grid lines are made of a material G being 1.0 or more in the absolute value of the difference between real part $n_1$ and imaginary part $\kappa_1$ of complex refractive index ($N_1 = n_1 - i\kappa_1$).

The term "lengthy" in the present invention means to be long enough to be wound in the roll state and is preferably 1 m or longer. The width of the grid polarizer film of the present invention is not particularly limited but it is preferably wide enough to be applied to a display with a large area. The width is usually 5 to 3000 cm to be specific.

The resin film constituting the present invention is preferably formed substantially in the plane state but may be formed in the curved state in general. Moreover, the resin film has a length more than approximately at least 5 times of the width, preferably has a length of 10 times or more of the width.

The resin film constituting the present invention is a film made of a transparent resin. The transparent resin film has a light transmittance in a visible area of 400 to 700 nm (or a wavelength of light when used as a polarizer) preferably at 80% or more, further preferably at 86% or more with a smooth surface. The resin film can be used as a laminated body by being bonded to quartz or optical glass.

Also, the resin film has haze of preferably 2.0% or less, further preferably 1.0% or less. The complex refractive index $N_0$ ($= n_0 - i\kappa_0$) of the resin film is preferably 1.4 to 1.8 in a real part $n_0$ and approximately 0 in an imaginary part $\kappa_0$.

Moreover, the resin film is preferably such that is not deformed by absorbing steam or the like. Specifically, water absorption is preferably 0.3 weight % or less, further preferably 0.1 weight % or less. The water absorption is measured at 23° C. for 24 hours according to JIS K 7209.

An average thickness of the resin film suitably used in the present invention is usually 5 μm to 1 mm, further preferably 20 to 200 μm in view of handling. If the thickness of the resin film is too large or too small, workability is lowered, which is not desirable.

A suitable resin film constituting the grid polarizer film of the present invention has fluctuation in a retardation value (a value defined by $Re = (n_x - n_y) \times d$, where d is a film thickness and $n_x$ and $n_y$ are main refractive indexes crossing in a film plane) in a plane with a wavelength of 550 nm is within ±10 nm, preferably within ±5 nm and fluctuation of an optical axis is within ±15°, preferably within ±10° in the width direction and the longitudinal direction.

The resin film preferably has a small average value of the in-plane retardation value Re from the viewpoint that smaller influence on light polarization is preferable and specifically, it is preferably 50 nm or less, further preferably 10 nm or less in the wavelength of 550 nm.

The suitable resin film used in the present invention has a linear expansion coefficient of 0.03% or less, preferably 0.01% or less when the film is left for 500 hours under an environment with a temperature of 60° C. and a relative humidity of 90%.

If the linear expansion coefficient exceeds the above range, the grid line can not hold substantial parallelism due to deformation of the film when used in a liquid crystal display, which might cause uneven brightness or color in a verge of the liquid crystal display. The linear expansion coefficient is measured according to JIS K2772.

A transparent resin constituting the resin film is not particularly limited, but from the viewpoint of workability onto a film surface, a glass transition temperature of the resin is preferably 60 to 200° C., further preferably 100 to 180° C. The glass transition temperature can be determined by differential scanning calorimetry (DSC).

Transparent resins constituting the resin film include polycarbonate resin, polyethersulphone resin, polyethylene terephthalate resin, polyimide resin, polyvinyl alcohol, epoxy resin, polymethylmethacrylate resin, polysulphone resin, poly allylate resin, polyethylene resin, polypropylene resin, polyvinyl chloride resin, cellulose diacetate, cellulose triacetate, alicyclic olefin polymer and the like. Among them, alicyclic olefin polymer is suitable from the viewpoint of transparency, low hygroscopicity, dimensional stability, and workability. As alicyclic olefin polymer, those described in Japanese Patent Laid-open No. 05-310845, Japanese Patent Laid-open No. 05-097978 and U.S. Pat. No. 6,511,756 can be cited, for example.

Alicyclic olefin polymer suitably used for the present invention is a polymer having cycloalkane structure in a main chain and/or side chain. From the viewpoint of mechanical strength and heat resistance, a polymer comprising the cycloalkane structure in a main chain is preferable. The cycloalkane structures include a monocyclic, polycyclic (fused polycyclic, bridged fused and the like). The number of carbon atoms constituting a single unit of the cycloalkane structure is not particularly limited but when it is usually 4 to 30 atoms, preferably 5 to 20 atoms, further preferably 5 to 15 atoms, various characteristics of the resin film such as mechanical strength, heat resistance and moldability are balanced well and suitable. Alicyclic olefin polymer used in the present invention is usually a thermoplastic resin.

In alicyclic olefin polymer, a repeating unit having the cycloalkane structure in all the repeating units in the main chain of the alicyclic olefin polymer is usually 30 to 100% by weight, preferably 50 to 100% by weight, further preferably 70 to 100% by weight. If the proportion of the repeating units having the cycloalkane structure is within the range, the resin film is excellent in heat resistance.

Alicyclic olefin polymer suitably used in the present invention is preferably hydrophobic substantially. Alicyclic olefin polymer may have a polar group as long as it is substantially hydrophobic. The polar groups include hydroxyl group, carboxyl group, alkoxyl group, epoxy group, glycidyl group, oxycarbonyl group, carbonyl group, amino group, ester group, carboxylic anhydride residual group, amide group, imido group and the like.

In order that alicyclic olefin polymer is substantially hydrophobic, contents of polar group in alicyclic olefin polymer is usually 0.8 mmol/g or less, preferably 0.5 mmol/g or less, further preferably 0.1 mmol/g or less.

Alicyclic olefin polymer is usually obtained by addition polymerization or ring-opening polymerization of olefin having a ring structure, and hydrogenation of an unsaturated bonded portion and aromatic ring portion as necessary.

Olefins having a ring structure used to obtain alicyclic olefin polymer include unsaturated hydrocarbons and their derivatives having polycyclic structure such as norbornene, dicyclopentadiene, tetracyclododecene, ethyltetracyclododecene, ethylidenetetracyclododecene, and tetracyclo[$7.4.0.1^{10,13}.0^{2,7}$]trideca-2,4,6,11-tetraene; unsaturated hydrocarbons and their derivatives having monocyclic structure such as cyclobutene, cyclopentene, cyclohexene, 3,4-dimethylcyclopentene, 3-methylcyclohexene, 2-(2-methyl butyl)-1-cyclohexene, cyclooctene, 3a,5,6,7a-tetrahydro-4,7-methano-1H-indene, cycloheptene, cyclopentadiene, and cyclohexadiene; aromatic vinyl compounds such as styrene, α-methylstyrene, and divinylbenzen; and alicyclic vinyl compounds such as vinylcyclohexane, vinylcyclohexene, vinylcyclopentane, and vinylcyclopentene. Olefin having a ring structure can be used alone or in combination of two or more.

A monomer capable of copolymerization with olefin having a ring structure can be rendered for addition copolymerization as necessary. Specific examples include ethylene or α-olefin with the number of carbons of 2 to 20 such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene; unconjugated diene such as 1,4-hexadiene, 4-methyl-1,4-hexadiene, 5-methyl-1,4-hexadiene, and 1,7-octadiene; and conjugated diene such as 1,3-butadiene, and isoprene. These monomers can be used alone or in combination of two or more.

Polymerization of olefin having a ring structure can be carried out according to a known method. Polymerization temperature, pressure and the like are not particularly limited but polymerization is usually made at a polymerization temperature of −50 to 100° C. and a polymerization pressure of 0 to 5 MPa. Hydrogenation reaction is carried out by blowing hydrogen in presence of a known hydrogenation catalyst.

As a specific example of alicyclic olefin polymer, mentioned are a ring-opening polymer of norbornene monomers and hydrogenated product thereof; an addition polymer of norbornene monomers and hydrogenated product thereof; addition polymer of norbornene monomers and vinyl compounds (such as ethylene, α-olefin and the like) and hydrogenated product thereof; a polymer of monocyclic cycloalkenes and hydrogenated product thereof; a polymer of alicyclic conjugated diene monomers and hydrogenated product thereof; a polymer of vinyl alicyclic hydrocarbon monomers and hydrogenated product thereof, aromatic ring-hydrogenated product of a polymer of aromatic vinyl compounds and the like. Among them, a hydrogenated product of ring-opening polymer of norbornene monomers, an addition polymer of norbornene monomers, an addition polymer of norbornene monomers and vinyl compounds (such as ethylene, α-olefin and the like), and an aromatic ring-hydrogenated product of aromatic olefin polymer are preferable, particularly a hydrogenated product of a ring-opening polymer of norbornene monomers is preferable. The above alicyclic olefin polymer can be used alone or in combination of two or more. The norbornene monomers, here, are monomers having a norbornene structure as shown in Chemical formula 1. A norbornene monomer is ring-opening polymerized to obtain a polymer having a repeating unit as shown in Chemical formula 2, and that is hydrogenated to obtain a polymer having a repeating unit as shown in Chemical formula 3. R1 and R2 in Chemical formulas to 3 illustrate a substituent group and R1 and R2 may be bonded so as to form a ring.

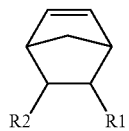

[Chemical formula 1]

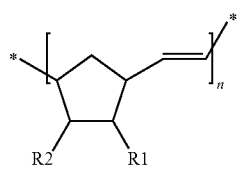

[Chemical formula 2]

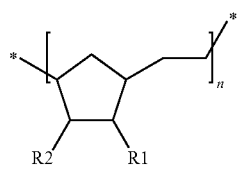

[Chemical formula 3]

The transparent resin used in the present invention is not particularly limited by its molecular weight. The molecular weight of the transparent resin is, when being measured by gel permeation chromatography (GPC) with cyclohexane or toluene as solvent, the weight average molecular weight (Mw) in polystyrene (when solvent is toluene) conversion or polyisoprene (when solvent is cyclohexane) conversion is usually in a range of 1,000 to 1,000,000, preferably 5,000 to 500,000, further preferably 10,000 to 250,000. When the weight average molecular weight (Mw) of the transparent resin is in this range, heat resistance, adhesion, surface smoothness and the like are well balanced and suitable.

Molecular weight distribution of the transparent resin being a ratio (Mw/Mn) of the weight average molecular weight (Mw) and number average molecular weight (Mn) as measured by GPC is usually 5 or less, preferably 4 or less, further preferably 3 or less.

The transparent resin used in the present invention may be compounded with a compounding agent such as colorant such as pigment and dye, fluorescent brightening agent, dispersing agent, heat stabilizer, light stabilizer, ultraviolet absorbing agent, antistatic agent, antioxidant, lubricant, and solvent as appropriate.

The resin film is obtained by molding the above transparent resin by known methods. For example, the methods include cast molding, extrusion molding, inflation molding and the like.

The grid lines constituting the lengthy grid polarizer film of the present invention are provided on the surface and/or inside the resin film. For example, as shown in FIG. 1, the grid polarizer film according to a first embodiment of the present invention comprises the above-mentioned resin film 2 and a plurality of grid lines 1 disposed substantially in parallel with each other on the upper face of the resin film. Here, the substantial parallelism means that even if the grid lines do not cross each other but a pitch between the grid lines are expanded or narrowed, for example, it is contained within approximately ±5% of an average pitch. It is necessary that a pitch between the grid lines is ½ or less of the wavelength of light to be used. The smaller the width of the grid line is, the smaller absorption of a polarized light constituent in the transmission direction becomes, which is preferable in characteristics. The grid polarizer film used for visible rays preferably has a pitch of the grid lines of usually 50 to 1000 nm, a line width of usually 25 to 600 nm, and a height of 10 to 800 nm.

A material used for the grid line is a material G being 1.0 or more in the absolute value of the difference between real part $n_1$ and imaginary part $\kappa_1$ of complex refractive index ($N_1=n_1-i\kappa_1$) and can be selected as appropriate from materials with either of the real part or the imaginary part of the complex refractive index is larger than the other and the absolute value of the difference is 1.0 or more. As specific examples of the material being 1.0 or more in the absolute value of the difference between the real part and the imaginary part of the complex refractive index, mentioned are metal; inorganic semiconductors such as silicon, germanium and the like; conductive polymers such as polyacetylene, polypyrrole, polythiophene, poly-p-phenylene and the like, and organic conductive materials obtained by doping these conductive resins using a dopant such as iodine, boron trifluoride, arsenic pentafluoride, perchloric acid and the like; organic-inorganic complex conductive materials obtained by drying a solution in which conductive metal particulates such as gold or silver are diffused in insulating resin and the like. Among them, from the viewpoint of productivity and durability of the grid polarizer film, metal materials are preferable. For efficient isolation of polarized light in a visible area, each of the real part $n_1$, the imaginary part $\kappa_1$ of the complex refractive index at a temperature of 25° C. and a wavelength of 550 nm is preferably 4.0 or less for $n_1$, 3.0 or more for $\kappa_1$ and the absolute value of the difference $|n_1-\kappa_1|$ is 1.0 or more, further preferably 2.0 or less for $n_1$, 4.5 or more for $\kappa_1$ and $|n_1-\kappa_1|$ is 3.0 or more. Those in the above preferable range include silver, aluminum, chromium, indium, iridium, magnesium, palladium, platinum, rhodium, ruthenium, antimony, tin and the like, and those in the further preferable range include aluminum, indium, magnesium, rhodium, tin and the like. The materials in the range of $n_1$ of 3.0 or more and $\kappa_1$ of 2.0 or less other than the above, preferably those with a range of $n_1$ of 4.0 or more and $\kappa_1$ of 1.0 or less can be also used suitably. Such materials include silicon. The complex refractive index $N_1$ is a theoretical relational expression of an electromagnetic wave and expressed as $N_1=n_1-i\kappa_1$ using the refractive index $n_1$ of the real part and the extinction coefficient $\kappa_1$ of the imaginary part. It is known that in a medium with the refractive index n, light travels faster than in vacuum, while in a medium with a larger extinction coefficient $\kappa$, light intensity is attenuated.

Though the detail is not known, the value of $|n_1-\kappa_1|$ has the following meaning. First, in the case of $n_1<\kappa_1$, the larger $\kappa_1$ is, the larger conductivity becomes, and since there are more free electrons capable of vibration in a direction of the grid lines, an electric field generated by incidence of polarized light ((electrical field with) polarized light in a direction parallel with the grid lines) is intensified, reflectance to the polarized light is increased. Since the width of the grid line is small, electrons can not move in a direction crossing the grid lines, the above effect is not generated to the polarized light in the direction crossing the grid lines but the light transmits. Also, since the wavelength of the incident light in the medium becomes larger if $n_1$ is smaller, the size (line width, lines pitch and the like) of a fine projection and recess structure becomes relatively smaller and hard to be affected by scattering, diffraction or the like, and the light transmission of polarized light in the direction crossing the grid lines, and reflectance of polarized light in the direction parallel with the grid lines are improved respectively. Here, the state of $|n_1-\kappa_1|$ at 1.0 or more indicates that the larger $\kappa_1$ and the smaller $n_1$ are more preferable.

On the other hand, in the case of $n_1>\kappa_1$, the larger $n_1$ is, the larger a difference in the refractive index between the grid line and a portion adjacent to it (air in FIG. 1) becomes, and structural birefringence tends to occur easily. On the other hand, if $\kappa_1$ is large, light absorption is increased, and it is more preferable if $\kappa_1$ is smaller in order to prevent light loss. Here, the expression that $|n_1-\kappa_1|$ is 1.0 or more indicates that it is more preferable if $n_1$ is larger and $\kappa_1$ is smaller.

The preferable lengthy grid polarizer film of the present invention comprises a plurality of rows of grooves extending substantially in parallel with each other formed on the surface of the resin film and a thin film constituting the grid line in which the thin film is made of the material G and is laminated on the bottom face of the groove and/or on the top face of the ridge located between the adjacent grooves. The grid lines are constituted by the thin films made of the material G laminated on the bottom face of the groove and/or on the top face of the ridge.

FIG. 2 is a perspective view illustrating a second embodiment of the grid polarizer film. FIG. 3 is a sectional view of a grid polarizer film 11 of the second embodiment. The grid polarizer film 11 shown in FIG. 2 has a resin film 42 and thin films 44 and 43 made of the material G. The grid lines are constituted by the thin films 44 and 43.

On the surface of the resin film 42, a plurality of rows of grooves X extending substantially in parallel with each other are formed. The groove X has a rectangular section as shown in FIG. 3. And a ridge is formed between the grooves. On the bottom face of the groove X, the thin film 43 is laminated. On the top face of the ridge, too, the thin film 44 is laminated. As shown in FIG. 3, the thin film is not laminated on the side face of the groove in the grid polarizer film 11, but the thin film may be laminated on the side face in a range that the object of the present invention can be achieved.

FIG. 4 is a perspective view illustrating a third embodiment of the grid polarizer film of the present invention. FIG. 5 is a sectional view of a grid polarizer film 12 in the third embodiment. The grid polarizer film 12 shown in FIG. 4 has a resin film 52 and thin films 54 and 53 made of the material G. The grid lines are constituted by the thin films 54 and 53.

On the surface of the resin film 52, a plurality of rows of grooves Y extending substantially in parallel with each other are formed. The groove Y has an isosceles trapezoid section as shown in FIG. 5. And a ridge is formed between the groves. On the bottom face of the groove Y, the thin film 53 is laminated. Also, on the top face of the ridge, the thin film 54 is laminated. As shown in FIG. 5, the thin film is laminated on the side face (inclined face) of the groove Y in the grid polarizer film 12, but the thin film may not be laminated on the side face.

The thin film is preferably formed so as to cover substantially the whole (approximately 95% or more) of the resin film surface seen when the grid polarizer film is seen from the normal direction. If a covered region is smaller than approximately 95%, the polarized light isolation performance can not be fully exerted in some cases. The film surface seen from the normal direction (above in parallel with the paper surface in FIG. 3 or 5) is the bottom face of the groove X and a top face of the ridge in FIG. 2, or the bottom face of the groove Y, top face of the ridge and both side faces of the groove in FIG. 4.

The material G used in the thin film has, as already mentioned above, a difference in absolute values of the real part $n_1$ and the imaginary part $\kappa_1$ of the complex refractive index $N_1$ of 1.0 or more. In the present invention, the material in which either one of the values of the real part $n_1$ and the imaginary part $\kappa_1$ is larger is preferable. Specifically, metals and semiconductors can be mentioned.

Metals include magnesium, aluminum, titanium, vanadium, chromium, manganese, iron, cobalt, nickel, copper, niobium, molybdenum, ruthenium, rhodium, palladium, silver, indium, tin, antimony, tungsten, iridium, platinum, gold, thallium and the like. One of them alone or two or more of them can be combined as an alloy for use. Among them, magnesium, aluminum, chromium, ruthenium, rhodium, silver, indium, tin, antimony, and gold are preferable.

Suitable semiconductors include single-element semiconductors such as silicon and germanium, and chemical compound semiconductors such as GaAs, InP, SiGe, $GaTZn_3P_2$, and $Pb_{1-x}Sn_xTe$. In these, silicon, SiGe, $GaTZn_3P_2$, $Pb_{1-x}Sn_xTe$ are preferable.

An average interval (pitch) d of the grooves is preferably 50 to 1000 nm, an average width of the groove or ridge is usually shorter than the light wavelength and is preferably 25 to 600 nm, and a height of the ridge or an average depth of the groove is preferably 50 to 800 nm. The groove length is usually longer than a wavelength of light and is preferably 800 nm or more. By setting the groove size within the above range, efficient brightness improvement effect can be expected for the light in the visible light region.

In the grid polarizer film in the present invention, a width t of the groove of the resin film, an interval d between the adjacent grooves, a slope angle $\theta$ of a side wall of the groove (expressed by the formula (A)), a depth $h_0$ of the groove, a film thickness $h_1$ of the thin film made of the material G laminated on the bottom face and/or a top face, the complex refractive index $N_0$ ($=n_0-i\kappa_0$) of the resin film for light with a wavelength in vacuum of $\lambda_0$ and the complex refractive index $N_1$ ($=n_1-i\kappa_1$; $n_1 \geq 2.5$ or $\kappa_1 \geq 1.5$) of the material G for light with a wavelength in vacuum of $\lambda_0$ preferably satisfy the relation of:

$$-0.1\delta < (h_0 - h_1); \text{ however, } \delta = \lambda_0/(2\pi^2 n_1^2 \kappa_1)^{1/2} \quad (1)$$

$$60° \leq \theta \leq 90°; \quad (2)$$

however, z is a distance in the groove depth direction; $\theta(z)$ is an inclination angle of a side face against a direction crossing the groove depth direction in the distance z;

[Formula 3]

$$\theta = \frac{1}{h_0} \int_0^{h_0} \theta(z)\, dz \quad (A)$$

$$d < \lambda_0/n_0, \text{ and} \quad (3)$$

$$0.1\, d < t < 0.8\, d \quad (4)$$

The reference character z is also a distance in the height direction when the bottom face of the groove is 0 ($h_0$ is the highest part of the groove). The reference character $\theta(z)$ may indicate an angle on the groove side made by a straight line corresponding to the side face of the groove and a straight line indicating the substrate surface in the distance z. The slope angle $\theta$ is an angle calculated by dividing the side face into fine portions when the side face portion of the groove is not a straight line, integrating an angle made by a tangent in each fine portion and a straight line indicating the substrate surface at the position in the height direction from the bottom face of the groove (height 0) to the highest part of the groove (height $h_0$) and dividing it by $h_0$.

If the side face portion of the groove is in the shape substantially close to a straight line, the slope angle $\theta$ may be an angle made by a straight line connecting the lowest part of the side face portion and the highest part of the side face portion and the substrate surface in the perpendicular sectional shape.

The groove depth $h_0$ is preferably larger than the film thickness $h_1$ of the thin film made of the material G. Also, the imaginary part $\kappa_1$ of the complex refractive index $N_1$ of the material G at the wavelength $\lambda_0$ is preferably 2 or more, further preferably 3 or more. By setting $h_0$, $h_1$, and $\kappa_1$ in this range, the polarized light isolation performance can be improved.

The slope angle $\theta$ is preferably 70° to 90°, further preferably 80° to 90°. The groove width t is preferably 0.2 d<t<0.7 d, further preferably 0.25 d<t<0.6 d.

By setting the slope angle $\theta$ and the groove width t in the above range, the polarized light isolation performance can be improved and manufacture of the grid polarized light isolating film can be facilitated, which are advantages.

The grooves in the same shape are preferably arranged strictly in parallel with an equal interval from the viewpoint of uniformity and stability of polarization performance, but there may be a shape error of approximately 10 to 20%.

If the groove shape includes an error, the above $h_0$, $h_1$, $\theta$, d, t are all expressed as an average value of all the grooves.

If the irradiated light includes a plurality of wavelengths, the grid polarizer film satisfying the above relation for all the wavelengths of the irradiated light can maintain polarized light isolation performance, that is, contrast performance favorable, which is preferable.

FIG. 3 is a sectional view of the grid polarizer film 11 of the second embodiment. As shown in FIG. 3, the grid polarizer film 11 has the resin film 42 in which the plurality of rows of grooves X extending substantially in parallel with each other are formed on the surface (perpendicularly to the paper surface in FIG. 3) and the thin films 43, 44 formed on the upper part in the figure of the resin film 42. In FIG. 3, the groove X has the section formed in the rectangular shape. Since the groove X has the rectangular section, the thin film is formed so as to cover the entire surface of the resin film including the groove X when the resin film is seen from the normal direction (above in parallel with the paper surface in FIG. 3), that is, on the bottom face of the groove and the top face of the ridge formed on the resin film 42.

When the groove X as in FIG. 3 is formed on the resin film 42, each value of the groove depth $h_0$, the film thickness $h_1$ of the thin film, the groove width t, and the interval d between the adjacent grooves is indicated as a dimension in each position shown in FIG. 3. The film thickness $h_1$ of the thin film is acquired as an average value of each film thickness of the thin film 43 laminated on the bottom face of the groove and the thin film 44 laminated on the top face of the ridge. In the grid polarizer film shown in FIG. 3, the slope angle $\theta$ is 90°.

FIG. 5 is a sectional view of the grid polarizer film 12 of the third embodiment. As shown in FIG. 5, the grid polarizer film 12 has the resin film 52 in which the plurality of rows of grooves Y extending substantially in parallel with each other (perpendicularly to the paper surface in FIG. 5) are formed on the surface and the thin films 53, 54, 55 formed on the upper part in the figure of the resin film 52. In FIG. 5, the groove Y is formed with a section in the shape of an inversed isosceles trapezoid with an upper side larger than a lower side. Since the groove Y has the inversed isosceles trapezoid section, the thin film is formed so as to cover the entire surface of the resin film including the groove Y when the resin film is seen from the normal line direction (above in parallel with the paper surface in FIG. 5), that is, continuously over the bottom face and the side face of the groove and the top face of the ridge formed on the resin film 52.

When the groove Y in the inversed isosceles trapezoid section as in FIG. 5 is formed on the resin film 52, each value of the groove depth $h_0$, slope angle $\theta$ is indicated as a dimension of each position shown in FIG. 5. The film thickness $h_1$ of the thin film is acquired as an average value of each film thickness of the thin film 53 laminated on the bottom face of the groove and the thin film 54 laminated on the top face of the ridge. The groove width t is expressed by the following formula (B).

[Formula 4]

$$t = \frac{1}{h_0}\int_0^{h_0} t(z)\,dz \qquad (B)$$

Here, the reference character t(z) indicates a distance between both side faces of the groove at a position z.

In the groove Y in the inversed isosceles trapezoid section shown in FIG. 5, a distance between the both side faces at the depth position corresponding to ½ of the groove depth $h_0$ is equal to the groove width t.

The interval d (pitch) between the adjacent grooves is a distance between specific positions of the adjacent grooves. In FIG. 5, it indicates a distance between the depth positions corresponding to ½ of the groove depth $h_0$.

In the present invention, as shown in FIG. 2, for example, the thin film is preferably formed also on the side surface of the groove and the thin film is preferably formed continuously over the top face of the ridge, the side face of the groove and the bottom face of the groove formed on the resin film. By forming the thin film on the side face of the groove, while sufficient polarized light isolation performance is provided, the average thickness of the thin film can be reduced. The effect can be exerted even if the film thickness is reduced, and time for producing the thin film by deposition or the like can be reduced, and manufacture of the grid polarizer film is facilitated. Also, by continuously forming the thin film, close contact between the resin film and the thin film is improved, and the even polarized light isolation performance can be exerted in any area in the grid polarizer film, which stabilizes the product quality. Since the thin film can be easily produced uniformly on a large area, it is also preferable in terms of manufacture.

The suitable lengthy grid polarizer film of the present invention has its polarizing transmission axis substantially in parallel with the film width direction. By having the polarizing transmission axis substantially in parallel with the film width direction, lamination with another lengthy polarizing optical film, particularly lengthy absorbing-type polarizing film can be carried out in the lengthy state without cutting, and productivity is excellent. The substantial parallelism here means within a range of ±5° from the parallel direction. Also, the suitable lengthy grid polarizer film of the present invention has the grid line extended substantially in parallel with the longitudinal direction of the film. By this arrangement, such an effect is expressed that polarized light parallel with the grid line formed by the above material is reflected and the polarized light perpendicular to the grid line is transmitted, and a lengthy grid polarizer film having a polarizing transmission axis in the film width direction can be obtained.

(Manufacturing Method of Grid Polarizer Film)

A manufacturing method suitable for the lengthy grid polarizer film of the present invention comprises forming a plurality of rows of grooves extending substantially in parallel with each other on the resin film surface using a transfer mold or transfer roller, and then forming a grid line by laminating a thin film made of the material G being 1.0 or more in the absolute value of the difference between the real part $n_1$ and the imaginary part $\kappa_1$ of the complex refractive index ($N_1=n_1-i\kappa_1$) on the bottom face of the groove and/or top face of the ridge located between the adjacent grooves.

And a manufacturing method of a grid polarizer film is provided in which on the transparent resin film surface with the complex refractive index $N_0$ ($=n_0-i\kappa_0$) for the light with a wavelength in vacuum of $\lambda_0$, a plurality of rows of grooves extending substantially in parallel with each other are formed by an emboss processing method so that a width t of the groove, an interval d between the adjoining groves, a slope angle $\theta$ of a side wall of the groove, and a depth $h_0$ of the groove satisfy the relation as follows:

$$-0.1\delta<(h_0-h_1); \text{ however, } \delta=\lambda_0/(2\pi^2 n_1^2\kappa_1)^{1/2} \qquad (1)$$

$$60°\leq\theta\leq 90°; \qquad (2)$$

however, z is a distance in the groove depth direction; $\theta(z)$ is an inclination angle of a side face against a direction crossing the groove depth direction in the distance z;

[Formula 5]

$$\theta = \frac{1}{h_0}\int_0^{h_0}\theta(z)\,dz \qquad (A)$$

$$d<\lambda_0/n_0, \text{ and} \qquad (3)$$

$$0.1\,d<t<0.8\,d, \qquad (4)$$

and a thin film made of the material G with the complex refractive index $N_1$ ($=n_1-i\kappa_1; n_1\geq 2.5$ or $\kappa_1\geq 1.5$) for the light with a wavelength in vacuum of $\lambda_0$ is laminated with the film thickness of $h_1$ on the bottom face of the groove and/or on the top face of the ridge located between the adjacent grooves.

The transfer mold or transfer roller used for the manufacturing method of the present invention is not particularly limited by a producing method thereof as long as the above groove and/or ridge can be formed, but the producing method may be such that the material with Mohs hardness of 9 or more is machined using high energy ray so as to fabricate a tool with a projection corresponding to the shape of the groove and/or ridge formed at the distal end, and a mold member or roll member is cut or the like using the tool so that the above groove and/or ridge is formed on the surface, for example.

FIG. 6 is a view showing an example of a tool 10 used for producing the transfer roller used in the manufacturing method of the present invention. A rectangular solid a with Mohs hardness of 9 or more is machined by high energy ray, a groove b is engraved on the surface at the distal end to give a plurality of straight projections 33 with the width of 600 nm or less, preferably 300 nm or less at the distal end in parallel with a constant interval, for example.

The shape of the projection formed at the distal end is not particularly limited but a section cut off on a plane perpendicular to the longitudinal of the straight projection can be a rectangle, triangle, semicircle, trapezoid, or a shape obtained by slightly deforming them, for example. If the tool having a projection with a rectangular section is used, the grid polarizer film in the shape as shown in FIG. 3 can be obtained, while if the tool having a projection with a trapezoidal section is used, the grid polarizer film in the shape as shown in FIG. 5 can be obtained. An arithmetic average roughness (Ra) of the projection formed at the distal end of the tool is preferably 10 nm or less, further preferably 3 nm or less.

The projection of the tool makes a recess on the surface of the mold member or roll member, while the recess of the tool makes a projection on the surface of the mold member or roll member. When a cutting tool with a projection section in a rectangle shown in FIG. 9 (width W1, pitch P1, and height H1) is used, a width W2 of the projection portion on the surface of the mold member or roll member is P1-W1, a pitch P2 of the projection portion is P1, and a height H2 of the projection portion is H1 or less. Considering this relation and heat expansion at time of transfer, the tool shape corresponding to the projection and recess shape in the nanometer order to be formed on the surface of the mold member or roll member can be determined. A width e of the projection at both side ends of the tool is preferably expressed as W1−25<e<W1+25 (unit: nm) or e=0 so that a pitch at the processing joint portion has a set value.

As a material with Mohs hardness of 9 or more used in the tool, diamond, cubic boron nitride, corundum and the like are mentioned. These materials are preferably used in single crystal or sintered body. A single crystal is preferable in view of processing accuracy and tool life, a single-crystal diamond or cubic boron nitride is further preferable since they have higher hardness, and single-crystal diamond is particularly preferable. Sintered bodies include metal bond with cobalt, steel, tungsten, nickel, bronze or the like as a sintered material; and vitrified bond with feldspar, soluble clay, fireclay, frit and the like as a sintered material, for example. Among them, diamond metal bond is suitable.

High energy ray used for production of the tool includes laser beam, ion beam, electronic beam and the like. Among them, ion beam and electronic beam are suitable. In processing by ion beam, a method of irradiating ion beam while blowing an active gas such as chlorofluorocarbon or chlorine onto the surface of the material (called as ion-beam aided chemical processing) is preferable. In processing by electronic beam, a method of irradiating electronic beam while blowing an active gas such as oxygen gas onto the surface of the material (called as electronic-beam aided chemical processing) is preferable. By these beam aided chemical processing, etching speed is expedited, re-adhesion of sputtered substances is prevented, and fine and highly accurate processing in the nanometer order can be carried out efficiently.

The tool obtained as above is pressed on the surface of the mold member or roll member, and the surface is cut or ground so as to obtain the transfer mold or transfer roller.

The cutting or grinding of the mold member or roll member is preferably carried out using a precision fine processing machine. The precision fine processing machine has moving accuracies of X, Y, Z axes preferably of 100 nm or less, further preferably 50 nm or less, particularly preferably 10 nm or less. The precision fine processing machine is installed preferably in a room with vibration displacement of 0.5 Hz or more controlled at 50 µm or less, further preferably in a room with vibration displacement of 0.5 Hz or more controlled at 10 µm or less for the above processing. The cutting or grinding of the mold member or roll member is carried out preferably in a temperature-controlled room with a temperature controlled within ±0.5° C. or further preferably in a temperature-controlled room with a temperature controlled within ±0.3° C.

The mold member or roll member used in the fine processing is not particularly limited but the surface of the mold member or roll member is preferably formed by a material with an appropriate hardness in order to form a fine lattice shape and is formed by a metal film formed by electrodeposition or electroless plating, for example. The material to constitute the metal film is preferably such that a metal film with Vickers hardness of 40 to 350, further preferably 200 to 300 can be obtained, specifically copper, nickel, nickel-phosphorous alloy, palladium and the like are mentioned, and among them, copper, nickel, nickel-phosphorous alloy are preferable.

The tool may be directly pressed onto the roll member so as to form the projection and recess shape in the nanometer order as above, but the transfer mold or transfer roller may be fabricated by a method in which the projection and recess shape in the nanometer order is formed by the above tool on the mold member so as to fabricate a metal plate by electrocasting on the mold member, the metal plate is peeled off the mold member and the metal plate is affixed onto the surface of the mold member or roll member.

A groove is formed by emboss processing on the resin film surface using the transfer mold or transfer roller obtained by the above method or the like so as to have a fine projection and recess shape. FIG. 7 is a view illustrating an example of a process forming the projection and recess shape on the surface of a resin film 30 by the transfer roller 22 used in the manufacturing method of the present invention. In FIG. 7, the resin film 30 is pressed and held between a transfer roller 22 and a roller on the opposite side with the resin film between them so that the projection and recess (projection and recess) shape on the peripheral face of the transfer roller is transferred onto the resin film. The sandwiching pressure of the transfer roller and the roller on the opposite side is preferably several MPa to several tens MPa. A temperature at the transfer is preferably Tg to (Tg+100)° C. when a glass transition temperature of the transparent resin constituting the resin film is Tg. A contact time between the resin film and the transfer roller can be adjusted by a feeding speed of the resin film, that is, a roller rotation speed, and is preferably 5 to 600 seconds.

Another method of continuously forming a fine projection and recess shape on the resin film surface is a method of transferring the projection and recess shape by pressing a photosensitive transparent resin on the transfer roller for exposure. Specifically, a photosensitive transparent resin solution is flow-cast, a solvent is removed and then, the transfer roller is pressed and light is irradiated at the same time to harden the photosensitive transparent resin for fixing the projection and recess shape.

Then, a thin film made of the material G is laminated on the bottom face of the groove and/or top face of the ridge on the projection and recess surface by the film thickness $h_1$ as mentioned above. In the case of the projection and recess surface with a section in the trapezoidal shape as shown in FIG. 5, the thin film is also laminated on the side face. The film thickness of the thin film formed on the side face is smaller than the film thickness of the thin film formed on the bottom face of the groove and the top face of the ridge.

The film forming method is not particularly limited. Various coating methods using a vacuum film-forming process such as vacuum deposition, sputtering, ion plating and the like and a wet process such as micro-gravure, screen coat, dip coat, electroless plating, electrolytic plating and the like can be used. Among them, the vacuum deposition and sputtering methods are preferable from the viewpoint of uniformity of the grid structure.

FIG. 8 is a diagram illustrating an example of a continuous sputtering device. A device 500 in FIG. 8 is a direct-current magnetron sputtering device in which a resin film with the above projection and recess shape in the nanometer order can be attached to a feeding-out roller 501 and a metal material to be deposited on a target 506 can be attached. A metal film is formed on the film surface by vacuuming a vacuum chamber, feeding out a film from the feeding-out roller 501, winding a film around a clean film-forming roller 503 and sputtering from the target 506. The film having formed the metal film is taken up by a take-up roller 504. Reference numerals 510-1 and 510-2 are protective plates which prevent adhesion of a deposition film on a spot other than a target.

By inclining a direction of sputtering or depositing of the metal and a direction of the projection and recess shape formed on the film, a portion where the metal film is formed and a portion without the metal film are produced. For example, in the resin film on which the projection and recess shape is formed as in FIG. 3, sputtering or the like from the normal direction of the resin film forms the metal film on the top face of the projection portion (ridge) and the bottom face of the recess portion (groove), but the metal film is not formed on the side face of the projection portion. Also, by sputtering or the like at a right angle to the longitudinal direction of the projection and recess shape and diagonally on the film face on the same resin film, the metal film is formed on the top face of the projection portion and a face on the upper half on the one side face of the projection portion, but the metal film is not formed on the bottom face of the recess portion, lower half on one side face and the other side face on the projection portion. Using the straightness of metal flowing by puttering and the projection and recess shape, a grid line arranged substantially in parallel with each other can be easily obtained.

Also, by forming a thin film on the top face of the projection portion and the bottom face of the recess portion as shown in FIG. 3 and then, by cutting off the projection portion of the resin film to the same height as the bottom face of the recess portion by etching processing or the like, the grid structure in the first embodiment as shown in FIG. 1 can be formed.

In the present invention, it is preferable that a transparent protective film is further laminated on the lengthy grid polarizer film in order to prevent corrosion on the grid line and to maintain the shape of the groove.

The transparent protective film may be formed only on one face of the lengthy grid polarizer film (it may be a face where the grid line is formed or a face without the grid line) or on both faces. There is no particular limitation on the transparent protective film as long as it transmits light and the film includes transparent plastic films made of: alicyclic olefin polymer; linear chain olefin polymers such as polyethylene, polypropylene and the like; cellulose esters such as triacetyl cellulose, cellulose acetate butyrate, cellulose propionate and the like; polyvinyl alcohol, polyimide, polyalylate, polystyrene, polyester, polycarbonate, polysulphone, polyethersulphone, amorphous polyolefin, modified acryl polymer, epoxy resin and the like; organic/inorganic complex film made of: organoalkoxysilane, inorganic fine particle dispersed acryl resin and the like; transparent inorganic films made of silicon nitride, aluminum nitride, silicon oxide, quartz, various optical glasses and the like.

There is no particular limitation on a method of laminating a transparent protective film, and there can be a method of laminating the lengthy grid polarizer film and transparent protective film using a laminator; a method of applying a coating agent comprising a composition forming a transparent protective film on the lengthy grid polarizer film and drying so as to laminate the transparent protective film; a method of forming a coating layer on the lengthy grid polarizer film by the above method and moreover, hardening it by heat or light; a method of laminating a transparent protective film on the lengthy grid polarizer film by vacuum deposition, ion plating, sputtering and the like.

Moreover, in the present invention, a reflection preventing film may be provided on the back face of the resin film (that is, on the face opposite the face where the thin film is laminated). The reflection preventing film is preferably $MgF_2$ film, $SiO_2$ film and $TiO_2$ film, and more preferably a laminated film including several of them. And it is further preferable that light transmission in a range of the light wavelength at 400 to 700 nm is 99% or more.

When light enters the grid polarizer film of the present invention, the polarized light in a direction parallel with the groove longitudinal direction regards the grid polarizer film substantially as a light absorbing medium, while the polarized light in a direction perpendicular to the groove longitudinal direction regards the grid polarizer film substantially as a dielectric body. Thus, such an isolation performance of polarized light is exerted that one of the polarized light in the incident light is reflected and/or absorbed while the other polarized light is transmitted.

The grid polarizer film of the present invention can be used for various applications. Particularly, it is suitably used as a brightness-improving film of a liquid crystal display. When it is used as the brightness-improving film, a liquid crystal display excellent in brightness for light with various wavelength and high contrast can be manufactured and used in many display devices including personal computers, television sets and the like.

(Optical Laminated Body)

The lengthy optical laminated body of the present invention comprises the above lengthy grid polarizer film and another lengthy polarizing optical film. Another polarizing optical film can be an absorbing-type polarizing film, phase-difference film, polarization diffraction film and the like. When the lengthy grid polarizer film is used as a brightness-improving film in the liquid crystal display, another polarizing optical film is preferably the absorbing-type polarizing film.

The absorbing-type polarizing film suitably used in the lengthy optical laminated body of the present invention transmits one of two linearly polarized lights crossing at a right angle and absorbs the other and includes a film obtained by having a dichroic material such as iodine and dichroic dye adsorbed in a hydrophilic polymer film such as a polyvinyl alcohol film, partially saponificated ethylene-vinyl acetate film and then uniaxially drawing it; a film obtained by uniaxially drawing the above hydrophilic polymer film and having dichroic material adsorbed; and a polyene-oriented film such as dehydrated substance of polyvinyl alcohol, dehydrochlorinated substance of polyvinyl chloride and the like. The thickness of the absorbing-type polarizing film is usually 5 to 80 μm.

A suitable manufacturing method to obtain the lengthy optical laminated body of the present invention is a method comprising feeding-out of the above lengthy grid polarizer film wound in the roll state and another lengthy polarizing optical film wound in the roll state from the respective rolls at the same time, while the grid polarizer film and another polarizing optical film are brought into close adhesion with each other. An adhesive may be interposed on a close-adhesion surface between the grid polarizer film and another polarizing optical film. As a method to bring the grid polarizer film and another polarizing optical film into close adhesion, the grid polarizer film and another polarizing optical film may be inserted together through a nip of two rolls arranged in parallel to be pressed and held between them.

The lengthy grid polarizer film and the lengthy optical laminated body in the present invention are used as an optical member cut out to a desired size according to the use mode.

(Liquid Crystal Display)

The liquid crystal display of the present invention is provided with an optical member cut out from the above lengthy grid polarizer film or lengthy optical laminated body. FIG. 12 schematically shows the liquid crystal display provided with the grid polarizer film of the present invention. The liquid crystal display provided with at least a liquid crystal panel comprising a liquid crystal cell LC capable of changing a polarizing transmission axis through voltage adjustment and absorbing-type polarizing films P1 and P2 arranged so as to hold the cell. The absorbing-type polarizing films P1 and P2 are usually arranged so that the respective polarizing transmission axes cross each other or are in parallel with each other. And in order to send light into this liquid crystal cell, on the back side of a display face, a backlight device is provided in a transmission-type liquid crystal display or a reflector is provided in a reflection-type liquid crystal display. In FIG. 12, a backlight device comprising a reflector W, a light source L, and a diffuser D is shown.

The lengthy grid polarizer film and lengthy optical laminated body of the present invention has a characteristic that one of crossing linearly polarized lights is transmitted, while the other is reflected. In the transmission-type liquid crystal display, the optical member cut out to a desired size from the lengthy grid polarizer film and lengthy optical laminated body of the present invention (hereinafter the cut-out member is called as "grid polarizer I") is arranged between the backlight device and the liquid crystal panel. It is arranged so that the longitudinal direction of the groove of the grid polarizer I is in parallel with a polarizing absorbing axis of the absorbing-type polarizer P1. When being arranged as above, light emitted at the backlight device is isolated by the grid polarizer I into two linearly polarized lights, and one of the linearly polarized lights goes to the direction of the liquid crystal panel, while the other returns to the direction of the backlight device. The backlight device is usually provided with a reflector, and the linearly polarized light having returned to the direction of the backlight device is reflected by the reflector and returns to the grid polarizer I again. The returned light is isolated to two polarized lights by the grid polarizer I again. By repeating this, the light emitted at the backlight device is effectively utilized. As a result, such effects can be obtained that the light can be efficiently used for display of an image on the liquid crystal display and the screen can be made brighter.

EXAMPLE

Examples and Comparative examples are shown for more specific explanation of the present invention, but the present invention is not limited to the following examples.

Example 1

Manufacture of Lengthy Grid Polarizer Film I

On a surface of 0.2 mm×1 mm of rectangular single-crystal diamond with the dimension of 0.2 mm×1 mm×1 mm brazed to a shank of 8 mm×8 mm×60 mm made by SUS, focused ion beam processing using argon ion beam was carried out by using a focused ion beam processing device (made by Seiko Instruments, SMI3050) so as to engrave grooves with the width of 0.1 μm and the depth of 0.1 μm with a pitch of 0.2 μm in parallel with a side with the length of 1 mm so as to fabricate a cutting tool comprising 1000 straight projections (ridges) with the width of 0.1 μm and the height of 0.1 μm with a pitch of 0.2 μm.

On the entire surface of the peripheral face of a roll made by cylindrical stainless steel SUS430 with the diameter of 200 mm and the length of 150 mm, nickel-phosphorous electroless plating with the thickness of 100 μm was applied and then, using the cutting tool fabricated in advance with straight projections and a precision cylindrical grinding machine (produced by Studer Co., precision cylindrical grinding machine S30-1), on a nickel-phosphorus electroless plated face, straight projections with the width of 0.1 μm, the height of 0.1 μm, and the pitch of 0.2 μm were cut and machined in a direction parallel with the circumferential face of the cylinder (that is, circumferential direction) so as to obtain a transfer roller 1.

The fabrication of the cutting tool by the focused ion beam processing and the cutting work on the nickel-phosphorous electroless plated face were carried out in a temperature-controlled low-vibration chamber with a temperature of 20.0±0.2° C. and displacement of vibration of 0.5 Hz or more controlled to 10 μm or less by a vibration control system (produced by Showa Science Co.).

A mixture 40/35/25 (weight ratio) of tricyclo[4.3.0.1$^{2,5}$]deca-3,7-diene (dicyclopentadiene, hereinafter abbreviated as "DCP"), 7,8-benzotricyclo[4.4.0.1$^{2,5}$.1$^{7,10}$]deca-3-ene (methanotetrahydrofluorene, hereinafter abbreviated as "MTF"), and tetracyclo[4.4.0.1$^{2,5}$.1$^{7,10}$]dodeca-3-ene (tetracyclododecene, hereinafter abbreviated as "TCD") was ring-opening polymerized by a known method and then, hydrogenated so as to obtain a hydrogenated product of a DCP/MTF/TCD ring-opening polymer. When a copolymerization ratio of each norbornene monomer in the hydrogenated product was calculated from composition ration of remaining norbornene monomers in a solution after polymerization (by gas chromatography), it was DCP/MTF/TCD=40/35/25, which was substantially equal to prepared composition ratio. A weight-average molecular weight of the hydrogenated product (Mw) was 35,000, molecular weight distribution was 2.1, hydrogenation ratio was 99.9%, and glass transition temperature Tg was 134° C.

The above hydrogenated product of ring-opening polymer was extrusion-molded at a molten resin temperature of 240° C. by using a T-die film melting extruder having a resin fusing and kneading machine provided with a screw of 65 mmΦ to obtain a base film A having a thickness of 100 μm. the base film A had an average retardation in a plane at the wavelength 550 nm of 4.5 nm, fluctuation of the in-plane retardation (Re) in the width direction and longitudinal direction of ±1.5 nm, and fluctuation of the optical axis of ±7°.

Using a transfer device comprising a nip roll made of a rubber roll with a diameter of 70 mm and the above transfer roller 1, by transferring the shape of the transfer roller surface on the surface of the base film A with the thickness of 100 μm under conditions of a surface temperature of the transfer roller at 160° C., a surface temperature of the nip roller at 100° C., a feeding tension of the film at 0.1 kgf/mm², and a nip pressure at 0.5 kgf/mm, a film having a straight projection with a width of 0.1 μm, height of 0.1 μm and pitch of 0.2 μm in parallel with the machine direction of the film was fabricated. And in succession, by continuous vacuum deposition of aluminum on the projection face from the normal direction a grid line was formed on the film surface. Moreover, in succession a protective film made of triacetylcellulose was overlapped on the grid line forming side by an urethane adhesive, and by supplying it to the nip of a pressurizing roller and pressing and bonding it, the lengthy grid polarizer film 1 was obtained. The obtained grid polarizer film 1 was wound up in the roll state.

width direction and longitudinal direction was ±2 nm and fluctuation of the optical axis was ±8°.

The absorbing-type polarizing film obtained in the example 1 and the above lengthy grid polarizer film 2 were wound out from the roll respectively, while the lengthy grid polarizer film was laminated on one face of the absorbing-type polarizing film through an adhesive layer using an urethane adhesive, a lengthy protective film made of triacetylcellulose was laminated on the another side of the absorbing-type polarizing film through an adhesive layer using the urethane adhesive, and the laminated body was supplied to the nip of the pressurizing roller and pressed and continuously bonded so as to obtain the lengthy optical laminated body 2. The obtained optical laminated body 2 was taken up in the roll state.

[Table 1]

TABLE 1

| | Base film | | | Display performance | | | Display performance after high temperature and high humidity | |
|---|---|---|---|---|---|---|---|---|
| | Refluctuation | Optical axis fluctuation | Linear expansion coefficient (%) | Brightness (cd/m²) | Uneven brightness | Uneven color | Uneven brightness | Uneven color |
| Ex. 1 | ±1.5 nm | ±7° | 0.01 | 201 | ○ | ○ | ○ | ○ |
| Ex. 2 | ±2.0 nm | ±8° | 0.03 | 190 | ○ | ○ | ○ | ○ |

The polarized light transmission axis of the lengthy grid polarizer film 1 was at a right angle with the longitudinal direction.

A lengthy poly-vinyl alcohol film with a thickness of 120 μm was uniaxially drawn in the longitudinal direction and this drawn film was continuously given a process of being soaked in an aqueous solution containing iodine and potassium iodide and then, in an aqueous solution of boric acid and potassium iodide, washed with water and dried so as to obtain a lengthy absorbing-type polarizing film with a thickness of 20 μm, which was taken up in a roll state. The polarized light transmission axis of this lengthy absorbing-type polarizing film was perpendicular to the longitudinal direction.

The above absorbing-type polarizing film and the lengthy grid polarizer film 1 obtained as above were wound out from the roll, while the lengthy grid polarizer film was laminated on one face of the absorbing-type polarizing film through an adhesive layer using an urethane adhesive, a lengthy protective film made of triacetylcellulose was laminated on the another side of the absorbing-type polarizing film through an adhesive layer using the urethane adhesive, and the laminated body was supplied to the nip of the pressurizing roller and pressed and continuously bonded so as to obtain the lengthy optical laminated body 1. The obtained optical laminated body 1 was taken up in the roll state.

Example 2

Manufacture of Lengthy Grid Polarizer Film 2

A lengthy grid polarizer film 2 was obtained similarly to the example 1 except that a base film B made of polycarbonate resin (Teijin chemicals ltd., Panlite K-1300Y) fabricated by a casting method instead of the base film A. The average in-plane retardation at the wavelength of 550 nm of the base film B was 8 nm, fluctuation of the in-plane retardation in the Evaluation in the above examples 1 and 2 shown in Table 1 was made by the following method.

(1) Retardation/Optical Axis in a Plane in the Width Direction and Longitudinal Direction of the Base Film and Their Fluctuation 5 points on the entire width in the width direction of the resin film with an equal interval and 5 points in the longitudinal direction with an interval of 100 mm were selected as measurement points. A rectangular piece was cut out from the resin film so that the measurement point came at the center. Using an automatic double refractometer (made by Oji Scientific Instruments, KOBRA21-ADH), a retardation value and an optical axis in the plane of the center (measurement point) of the cut-out rectangular piece were measured. Fluctuation of retardation values in the plane was acquired from a difference from an average of the retardation measured value. Fluctuation of the optical axis was acquired from an angular difference from an average of measured values of the optical axis at 0° in the optical axis direction. A measurement wavelength was set at 550 nm.

(2) Linear Expansion Coefficient of Base Film

A resin film was punched out to obtain a rectangular piece of 50 mm×50 mm. The length of a side of the rectangular piece was measured. The rectangular piece was left for 500 hours under an environment at a temperature of 60° C. and a relative humidity of 90%. The length of the side of the rectangular piece having been left for the 500 hours was measured and from a change in the length between before and after being left in an environment at a high temperature and a high humidity, the linear expansion coefficient was calculated according to the following formula:

Linear expansion coefficient (%)=|(length after being left in an environment at a high temperature and a high humidity)−(length before being left in an environment at a high temperature and a high humidity)|/(length before being left in an environment at a high temperature and a high humidity)×100

(3) Display Performance

The optical laminated body was cut out to a desired size, and on the side of the absorbing-type polarizing film of the optical laminated body, a viewing-angle expansion film (product name: WV film, made by Fujifilm corporation), transmission-type TN liquid crystal cell, absorbing-type polarizing plate (The transmission axis of the absorbing-type polarizing plate crosses the transmission axis of the absorbing-type polarizing film) were placed in this order. They were restrained by an outer frame of the rectangle and integrated so as to fabricate a panel.

The above panel was placed on the backlight device provided with a light diffusing sheet on the outgoing face side of a light guide plate provided with a light reflecting sheet on the back face side and a cold cathode tube on the incident end face side to obtain a liquid crystal display.

The front brightness of the obtained liquid crystal display was assessed using a brightness meter (product name: BM-7, made by Topcon corporation). Also, uneven color and uneven brightness from the front direction when the background was in black display and in blue display were visually observed. The mark "O" in Table 1 means that "no uneven color" or "no uneven brightness."

(4) High-Temperature High-Humidity Test

After measurement of the above (3) display performance, the panel was removed from the liquid crystal display. The removed panel was left for 500 hours under an environment at a temperature of 60° C. and a relative humidity of 90% and then, left for 24 hours under an environment at a room temperature and room humidity. The panel was placed on the backlight device again and the liquid crystal display device was reassembled. With the background in black display and in blue display, uneven color and uneven brightness from the front direction were visually observed. The mark "O" in Table 1 means that "no uneven color" or "no uneven brightness."

Example 3

Manufacture of Lengthy Grid Polarizer Film 3

On a face of 0.2 mm×1 mm of rectangular single-crystal diamond with the dimension of 0.2 mm×1 mm×1 mm brazed to a shank of 8 mm×8 mm×60 mm made by SUS, focused ion beam processing using argon ion beam was carried out by using a focused ion beam processing device (made by Seiko Instruments, SMI3050) so as to engrave grooves with the width of 50 nm and the height of 60 nm with a pitch of 130 nm in parallel with a side with the length of 1 mm so as to fabricate a cutting tool comprising straight projections with the width of 80 nm and the height of 60 nm with a pitch of 130 nm.

On the entire surface of the peripheral face of a roll made by cylindrical stainless steel SUS430 with the diameter of 80 mm and the length of 125 mm, nickel-phosphorous electroless plating with the thickness of 100 μm was applied and then, using the cutting tool fabricated in advance with straight projections and a precision cylindrical grinding machine (made by Studer Co., precision cylindrical grinding machine S30-1), on the nickel-phosphorous electroless plated face, straight projections with the width of 50 nm, the height of 60 nm, and the pitch of 130 nm were cut in a direction parallel with the circumferential face of the cylinder so as to obtain a transfer roller 2.

The fabrication of the cutting tool by the focused ion beam processing and the cutting work on the nickel-phosphorous electroless plated face were carried out in a temperature-controlled low-vibration chamber with a temperature of 20.0±0.2° C. and displacement of vibration of 0.5 Hz or more controlled to 10 μm or less by a vibration control system (by Showa Science).

Except that the above transfer roller 2 is used as a transfer roller, by transfer similar to the example 1, a plurality of rows of substantially parallel recesses with the width of 50 nm and height of 60 nm were formed on the film surface with a pitch (interval between recesses) 130 nm.

Next, using a sputtering device, aluminum was laminated in the thickness of 30 nm on the face of the recess side of the above film. The lengthy grid polarizer film 3 as shown in FIG. 10 was fabricated as above. Dimensions and the like of the fabricated grid polarizer film is shown in Table 2.

[Table 2]

TABLE 2

| | Shape of groove | | | | Light absorbable thin film layer | | | | |
|---|---|---|---|---|---|---|---|---|---|
| | Interval d (nm) | Width t (nm) | Depth $h_0$ (nm) | Angle θ (degree) | Material | Thickness $h_1$ (nm) | $h_0$-$h_1$ (nm) | $h_0$/t | t/d |
| Ex. 3 | 130 | 50 | 60 | 90 | Al | 30 | 30 | 1.2 | 0.38 |

A sheet-state grid polarizer film was obtained by punching out the obtained lengthy grid polarizer film in a predetermined shape. With respect to this grid polarizer film, a light source, a polarizing plate for generating polarized light, the above grid polarizer film and a light detector using a spectrophotometer (made by JASCO Corporation) were arranged on an optical path in this order, polarized light with wavelengths of 430 nm, 530 nm, or 630 nm was irradiated to the grid polarizer film and the performance was evaluated. Complex refractive indexes and the like of a thin film layer in each measurement wavelength are shown in Table 3. Light transmittance vibrating in a direction perpendicular to the longitudinal direction of the groove, which is polarized light most susceptible to transmission (polarization transmittance) in this grid polarizer film, and light transmittance vibrating in a direction in parallel with the groove longitudinal direction, which is polarized light most difficult to transmit, were measured, and contrast as the ratio of them was acquired. The result of polarization transmittance and contrast is shown in Table 3.

[Table 3]

TABLE 3

| | Measurement wavelength (nm) | thin-film layer complex refractive index | | Refractive index of base plate | $\lambda_0/n_0$ (nm) | $\delta$ (nm) | Polarization transmittance (%) | Contrast |
|---|---|---|---|---|---|---|---|---|
| | | real part | imaginary part | | | | | |
| Ex. 3 | 430 | 0.56 | 5.23 | 1.53 | 281 | 76 | 79 | 120 |
| | 530 | 0.88 | 6.44 | 1.53 | 346 | 53 | 77 | 240 |
| | 630 | 1.36 | 7.60 | 1.53 | 412 | 38 | 72 | 380 |

For the complex refractive index measurement of the grid polarizer film in each measurement wavelength, a flat-plate film in the same material separately prepared and measured with a spectro-ellipsometer (made by J. A. Woollam JAPAN Co., Inc.) was used.

For the shape measurement of the grid polarizer film, a part of the grid polarizer film was given focused ion beam (FIB) processing into a thin wall state so as to expose a section, and the shape was measured by transmission electron microscope (TEM). The shape of the groove and aluminum film thickness were measured, respectively, for 10 intervals and average values were taken as measured values.

Example 4

Manufacture of Lengthy Grid Polarizer Film 4

By a method similar to the example 3, a grid polarizer film as shown in FIG. 11 was fabricated and similarly evaluated. The grid polarizer film had a groove shape different from the grid polarizer film in the example 3 and the sectional shape of the groove was an inversed isosceles trapezoid. Dimensions and the like of such a grid polarizer film are shown in Table 4. Its evaluation result is shown in Table 5.

As shown in the examples 3 and 4, by satisfying the relation of the above (1) to (4), values of the polarization transmittance and contrast are sufficiently large and it is known that the present invention is excellent in polarization transmittance and contrast.

What is claimed is:

1. A lengthy grid polarizer film comprising:
   a transparent and lengthy resin film, of which a plurality of rows of grooves extending substantially in parallel with each other are formed on the surface; and
   a thin film made of a material G being 1.0 or more in the absolute value of the difference between the real part $n_1$ and the imaginary part $\kappa_1$ of the complex refractive index ($N_1 = n_1 - i\kappa_1$) thereof, and laminated on the bottom face of the grooves and/or on the top face of a ridges of ridges located between the adjacent grooves;
   in which a width t of the grooves of said resin film, an interval d between said adjacent grooves, the slope angle $\theta$ of the side wall of the grooves, the depth $h_0$ of the grooves, the film thickness $h_1$ of the thin film laminated on the bottom face and/or the top face, the complex refractive index $N_0$ ($=n_0-i\kappa_0$) of the resin film for light at the wavelength in vacuum of $\lambda_0$ and the complex refrac-

[Table 4]

TABLE 4

| | Shape of groove | | | | Light absorbable thin film layer | | | | |
|---|---|---|---|---|---|---|---|---|---|
| | Interval D (nm) | Width t (nm) | Depth $h_0$ (nm) | Angle $\theta$ (degree) | Material | Thickness $h_1$ (nm) | $h_0-h_1$ (nm) | $h_0/t$ | t/d |
| Ex. 4 | 75 | 46 | 45 | 85 | Al | 20 | 25 | 0.98 | 0.61 |

[Table 5]

TABLE 5

| | Measurement wavelength (nm) | thin-film layer complex refractive index | | Refractive index of base plate | $\lambda_0/n_0$ (nm) | $\delta$ (nm) | Polarization transmittance (%) | Contrast |
|---|---|---|---|---|---|---|---|---|
| | | real part | imaginary part | | | | | |
| Ex. 4 | 430 | 0.56 | 5.23 | 1.53 | 281 | 76 | 76.9 | 45 |
| | 530 | 0.88 | 6.44 | 1.53 | 346 | 53 | 76.5 | 77 |
| | 630 | 1.36 | 7.60 | 1.53 | 412 | 38 | 69.4 | 99 | tive index $N_1$ ($=n_1-i\kappa_1$; $n_1 \geqq 2.5$ or $\kappa_1 \geqq 1.5$) of the material G for light at the wavelength in vacuum of $\lambda_0$ satisfy the relation of:

$$-0.1\delta < (h_0-h_1); \text{ however, } \delta = \lambda_0/(2\pi^2 n_1^2 \kappa_1)^{1/2} \quad (1)$$

$$60° \leqq \theta \leqq 90°; \quad (2)$$

when, z is the distance in the groove depth direction; $\theta(z)$ is the inclination angle between the side face and the direction perpendicular to the groove depth direction in the distance z;

$$\theta = 1/h_o \int_0^{h_0} \theta(z)\,dz \quad (A)$$

$$d < \lambda_0/n_0, \text{ and} \quad (3)$$

$$0.1d < t < 0.8d. \quad (4)$$

2. The grid polarizer film according to claim 1, wherein said thin film is further formed on the side face of the grooves.

3. The grid polarizer film according to claim 1, wherein said thin film is formed continuously on the bottom face and side face of the grooves and on the top face of ridges.

4. The grid polarizer film according to claim 1, wherein said resin film, in the width direction and longitudinal direction of the resin film, has fluctuation of an in-plane retardation value (Re) at a wavelength of 550 nm within ±10 nm and fluctuation of the direction of optical axis within ±15°.

5. The grid polarizer film according to claim 1, wherein said resin film has the linear expansion coefficient of 0.03% or less after being undisturbed for 500 hours under an environment at the temperature of 60° C. and the relative humidity of 90%.

6. The grid polarizer film according to claim 1, further comprising a transparent protective film laminated on at least one of the front face and back face.

7. A manufacturing method of the lengthy grid polarizer film as described in claim 1, comprising
  forming a plurality of rows of grooves extending substantially in parallel with each other on a lengthy resin film surface using a transfer mold or a transfer roller, and then
  forming grid lines on the bottom face of the grooves and/or on the top face of the ridges located between the adjacent grooves by laminating a thin film made of a material G being 1.0 or more in the absolute value of the difference between the real part $n_1$ and the imaginary part $\kappa_1$ of the complex refractive index ($N_1 = n_1 - i\kappa_1$).

8. A manufacturing method of the grid polarizer film as described in claim 1, comprising, on a transparent resin film surface with the complex refractive index $N_0$ ($=n_0-i\kappa_0$) for the light with a wavelength in vacuum of $\lambda_0$,
  forming a plurality of rows of grooves extending substantially in parallel with each other by an emboss processing method so that a width t of the groove, an interval d between the adjoining grooves, a slope angle $\theta$ of a side wall of the groove, and a depth $h_0$ of the groove would satisfy the relation as follows:

$$-0.1\delta < (h_0-h_1); \text{ however, } \delta = \lambda_0/(2\pi^2 n_1^2 \kappa_1)^{1/2} \quad (1)$$

$$60° \leqq \theta \leqq 90°; \quad (2)$$

when, z is the distance in the groove depth direction; $\theta(z)$ is the inclination angle between the side face and a direction perpendicular to the groove depth direction at the distance z;

$$\theta = 1/h_o \int_0^{h_0} \theta(z)\,dz \quad (A)$$

$$d < \lambda_0/n_0, \text{ and} \quad (3)$$

$$0.1d < t < 0.8d; \text{ and} \quad (4)$$

laminating a thin film made of the material G with the complex refractive index $N_1$ ($=n_1 i\kappa_1$; $n_1 \geqq 2.5$ or $\kappa_1 \geqq 1.5$) for the light with a wavelength in vacuum of $\lambda_0$ with the film thickness of $h_1$ on the bottom face of the groove and/or on the top face of the ridge located between the adjacent grooves.

9. A lengthy optical laminated body comprising the lengthy grid polarizer film according to claim 1 and another lengthy polarizing optical film.

10. The lengthy optical laminated body according to claim 9, wherein said another lengthy polarizing optical film is an absorbing-type polarizer film.

11. A manufacturing method of a lengthy optical laminated body comprising feeding out the lengthy grid polarizer film described in claim 1 wound in a roll shape and another lengthy polarizing optical film wound in a roll shape from the respective rolls, while the grid polarizer film and the another polarizing optical film are laminated in close adhesion.

12. A liquid crystal display comprising an optical member cut out from the lengthy grid polarizer film as described in claim 1.

* * * * *